(12) United States Patent
Kirisken et al.

(10) Patent No.: US 11,099,678 B2
(45) Date of Patent: Aug. 24, 2021

(54) METHOD AND DEVICE FOR SENSING PRESSURE APPLIED TO A SCREEN WITH AT LEAST ONE SENSOR MEANS

(71) Applicant: VESTEL ELEKTRONIK SANAYI VE TICARET A.S., Manisa (TR)

(72) Inventors: Barbaros Kirisken, Manisa (TR); Görkem Özvural, Manisa (TR)

(73) Assignee: Vestel Elektronik Sanayi Ve Ticaret A.S., Manisa (TR)

( * ) Notice: Subject to any disclaimer, the term of this patent is extended or adjusted under 35 U.S.C. 154(b) by 381 days.

(21) Appl. No.: 15/781,904

(22) PCT Filed: Dec. 9, 2016

(86) PCT No.: PCT/EP2016/080394
§ 371 (c)(1),
(2) Date: Jun. 6, 2018

(87) PCT Pub. No.: WO2017/097960
PCT Pub. Date: Jun. 15, 2017

(65) Prior Publication Data
US 2020/0333938 A1    Oct. 22, 2020

(30) Foreign Application Priority Data
Dec. 11, 2015   (EP) ..................................... 15199481

(51) Int. Cl.
*G06F 3/041* (2006.01)
*H01M 50/578* (2021.01)
(Continued)

(52) U.S. Cl.
CPC .......... *G06F 3/0414* (2013.01); *G06F 3/0418* (2013.01); *G06F 3/0446* (2019.05);
(Continued)

(58) Field of Classification Search
USPC ........................................................ 345/173
See application file for complete search history.

(56) References Cited

U.S. PATENT DOCUMENTS

2007/0119698 A1* 5/2007 Day ........................ G06F 3/044
200/510
2008/0094367 A1* 4/2008 Van De Ven ......... G06F 3/0488
345/173
(Continued)

FOREIGN PATENT DOCUMENTS

CN    103069365 A    4/2013
JP    2000231446 A    8/2000
(Continued)

OTHER PUBLICATIONS

The International Search Report (ISR) with Written Opinion for PCT/EP2016/080394 dated Jun. 13, 2017, pp. 1-20.
(Continued)

*Primary Examiner* — Chineyere D Wills-Burns
(74) *Attorney, Agent, or Firm* — McDonnell Boehnen Hulbert & Berghoff LLP

(57) ABSTRACT

The invention describes a device (101), in particular multimedia device, and a method, wherein the device at least comprises a screen (105), a processor unit (152) and at least one pressure sensor means (102), wherein the pressure sensor means (102) is mounted on a rigid element (106), wherein the rigid element (106) is more rigid than the screen (105), wherein the rigid element (106) is arranged on one side of the sensor means (102) and wherein the screen (105) is arranged on an opposing side of the sensor means (102), wherein a location detection unit (190) is provided, wherein the location detection unit (190) is configured to output a location signal, wherein the location signal provides location information for identifying the location where pressure is applied to the screen (105), wherein the pressure sensor
(Continued)

means (102) is configured to output a pressure signal, wherein the pressure signal provides pressure information about the pressure measured by the pressure sensor means (102), wherein the processor unit (152) determines a pressure value for the pressure applied to the screen (105) by means of a location-pressure-function, wherein the location-pressure-function defines at least a dependency between the location information and the pressure information and wherein the processor unit (152) causes a function, an operation or an effect in dependency of the pressure value.

11 Claims, 8 Drawing Sheets

(51) Int. Cl.
 *G06F 3/044* (2006.01)
 *G06F 3/046* (2006.01)
(52) U.S. Cl.
 CPC ...... *G06F 3/04186* (2019.05); *H01M 50/578* (2021.01); *G06F 2203/04105* (2013.01); *G06F 2203/04106* (2013.01); *H01M 2200/20* (2013.01)

(56) References Cited

U.S. PATENT DOCUMENTS

| | | | | |
|---|---|---|---|---|
| 2009/0195959 A1* | 8/2009 | Ladouceur | ............ | G06F 3/0202 361/283.1 |
| 2011/0141052 A1* | 6/2011 | Bernstein | ............ | G06F 3/03547 345/174 |
| 2012/0299555 A1 | 11/2012 | Tam et al. | | |
| 2013/0082970 A1* | 4/2013 | Frey | .................... | G06F 3/04144 345/173 |
| 2013/0222238 A1* | 8/2013 | Sliger | .................. | G06F 3/0412 345/157 |
| 2013/0342501 A1* | 12/2013 | Molne | ................. | G06F 3/04186 345/174 |
| 2014/0085254 A1* | 3/2014 | Tenuta | .................. | G06F 3/0447 345/174 |
| 2014/0204285 A1* | 7/2014 | Jang | .................... | G02F 1/13338 349/12 |
| 2014/0253488 A1 | 9/2014 | Vukovic et al. | | |
| 2014/0292699 A1 | 10/2014 | Ando | | |
| 2014/0342193 A1 | 11/2014 | Mull et al. | | |
| 2015/0118525 A1 | 4/2015 | Zheng et al. | | |
| 2015/0138112 A1* | 5/2015 | Campbell | ............... | G01L 1/142 345/173 |
| 2017/0102809 A1* | 4/2017 | Son | ....................... | G06F 3/0447 |

FOREIGN PATENT DOCUMENTS

| | | |
|---|---|---|
| JP | 2013127690 A | 6/2013 |
| JP | 2015521347 A | 7/2015 |
| WO | WO 2015/062235 | 5/2015 |

OTHER PUBLICATIONS

Second Written Opinion of the International Preliminary Examining Authority for PCT/EP2016/080394 dated Dec. 21, 2017, pp. 1-9.
The International Preliminary Report on Patentability (IPRP) for PCT/EP2016/080394 dated Mar. 28, 2018, pp. 1-28.

* cited by examiner

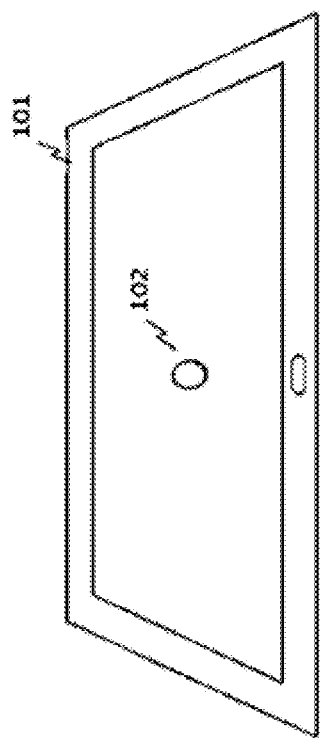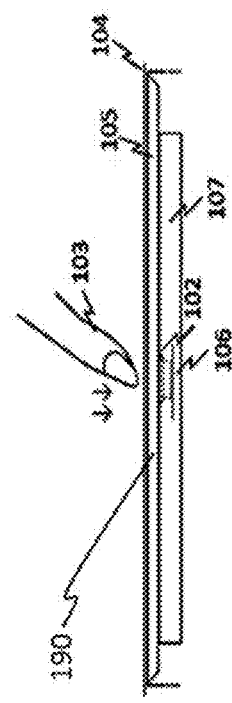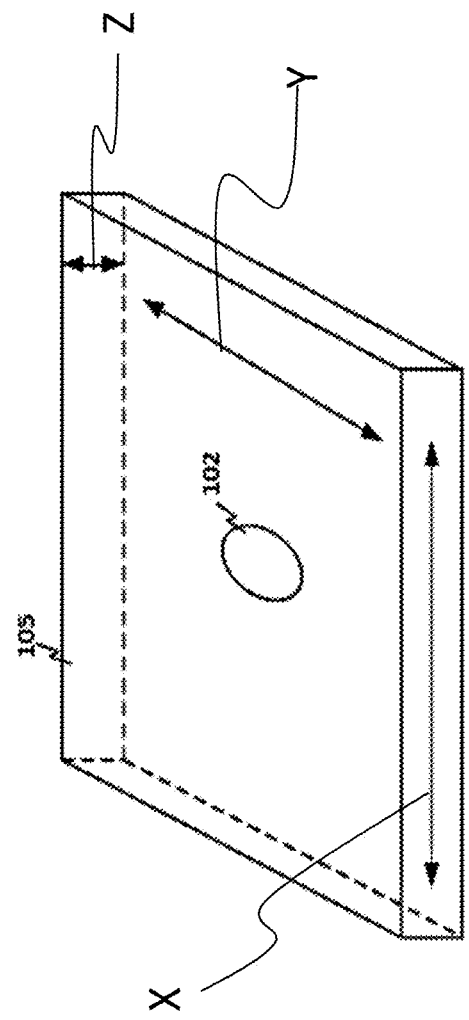
Fig. 3
Fig. 4
Fig. 5

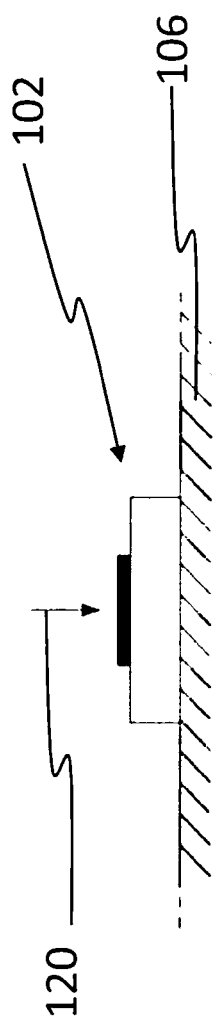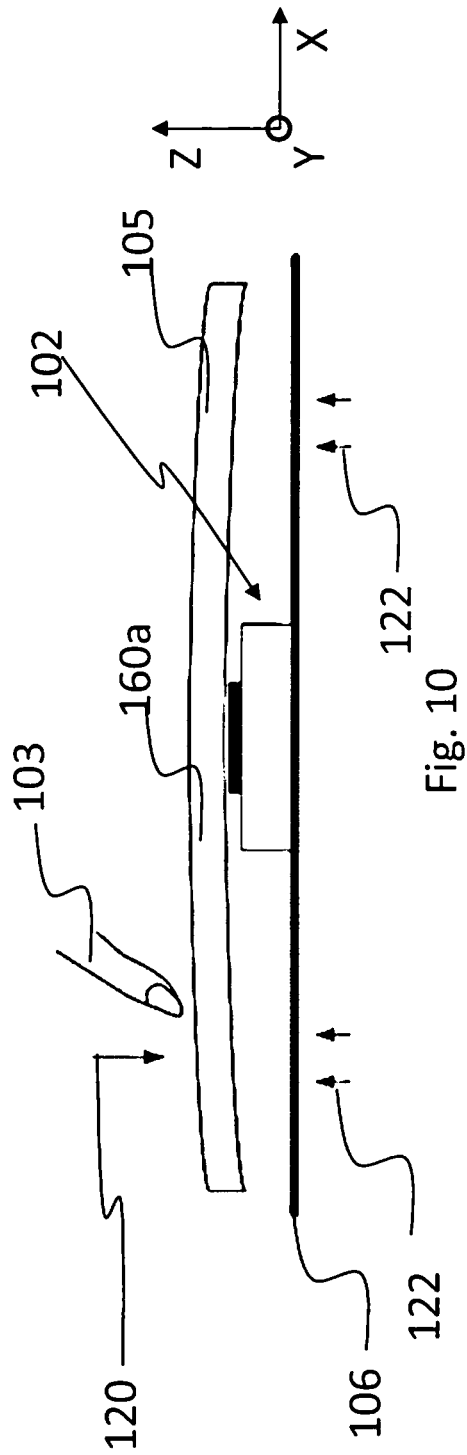

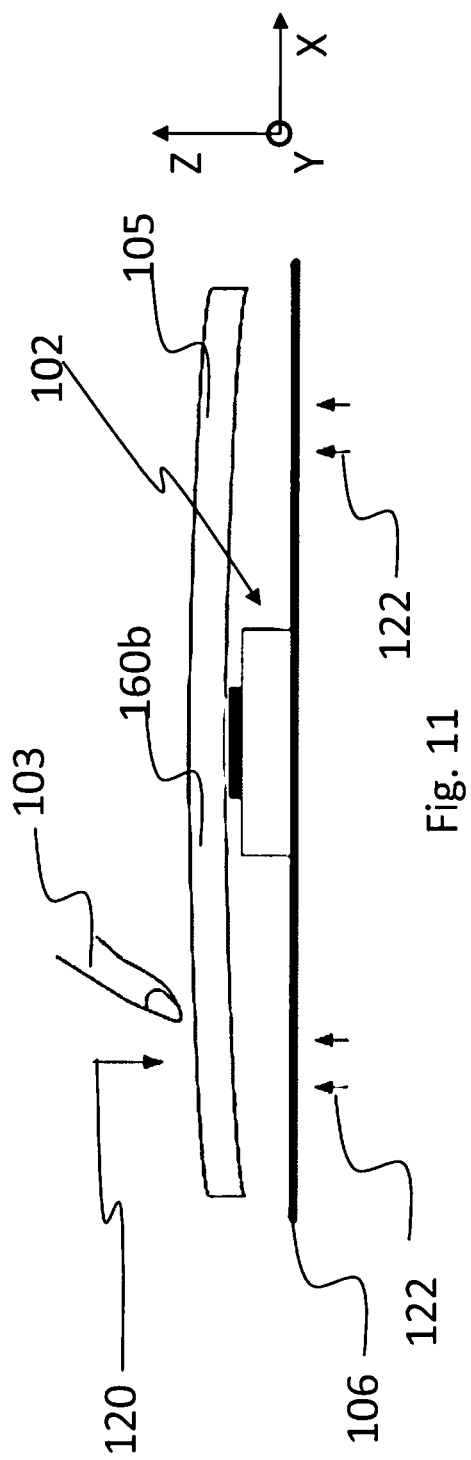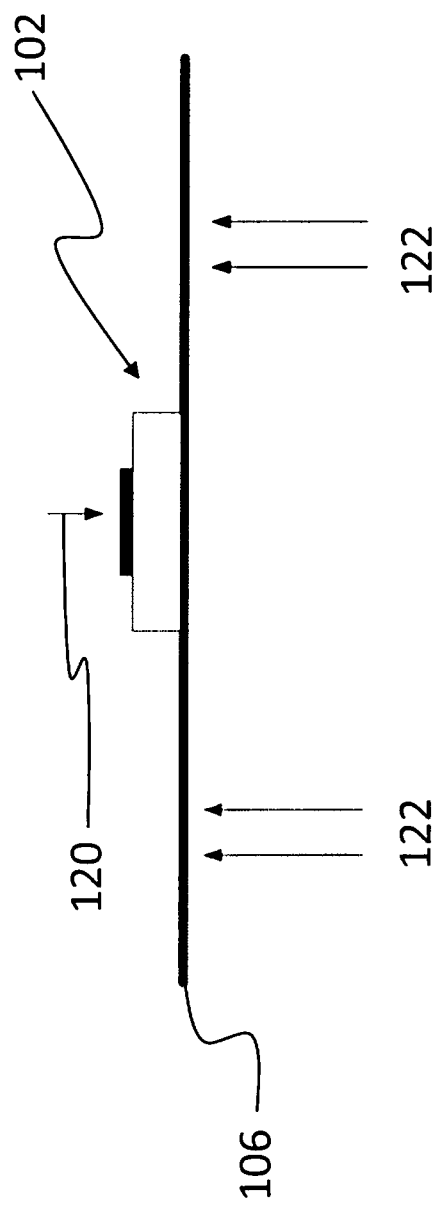

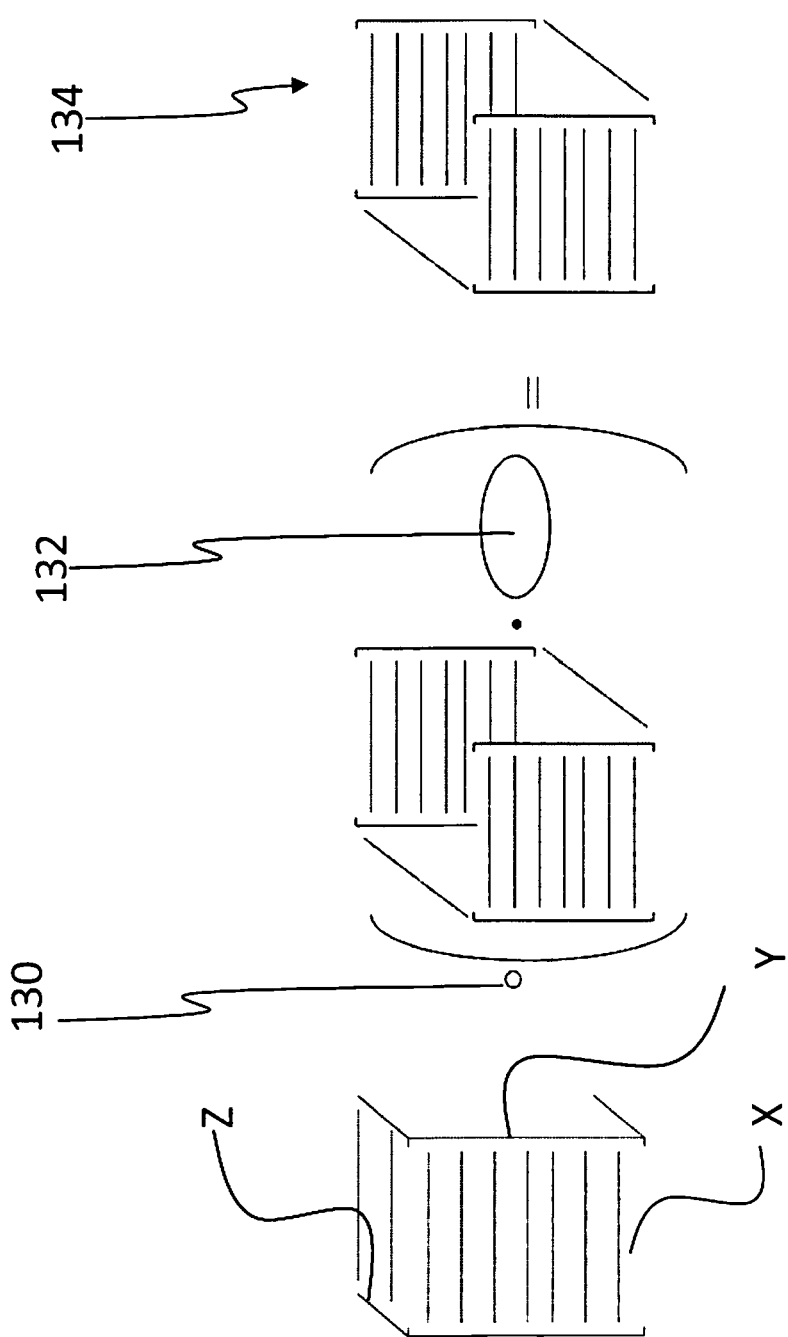

METHOD AND DEVICE FOR SENSING PRESSURE APPLIED TO A SCREEN WITH AT LEAST ONE SENSOR MEANS

CROSS-REFERENCE TO RELATED APPLICATION

This application is a U.S. national phase of International Application No. PCT/EP2016/080394, filed on Dec. 9, 2016, which claims priority to European Patent Application No 15199481.1, filed Dec. 11, 2015, both of which are incorporated by reference herein in their entirety.

The present invention concerns a device according to claim 1 and a method according to claim 13.

FIELD OF THE INVENTION

The invention is generally related to devices, in particular multimedia devices, having a screen for outputting visual information. Such devices may be smartphones, laptops, tablets, e-reader, ultrabooks, smart watches, ect.

BACKGROUND OF THE INVENTION

Device screens are not only used to output visual information they are also used to control functions of the device.

Some approaches are already implemented in such devices, wherein the information of how much pressure is applied to a specific location of a screen is crucial. Unlike resistive touch screens, capacitive touch screens cannot detect how much pressure is applied to the screen. Many different techniques applied to measure pressure with capacitive touch screens such as software methods which measure the increase of size of fingertip or methods like US20140354587A1, where a non-flat surface is used.

More recent applications on the market is from Apple where they either measure light scattering is measured on LGP (used in mobile phones and called Force Touch) or where four pressure sensors are arranged under a touchpad (used in ultrabooks and called Force Click).

Further technical approaches are e.g. disclosed by EP2860611A1, which describes an user interface method and apparatus based on spatial location recognition. Also US20140139426 discloses a further technology concerning a SmartLight Interaction System describing some kind of 3D matrices and corrections on image transformations.

All approaches have to provide information respectively data about the applied pressure in high quality. Such devices also need to be inexpensive, slim and/or light.

DESCRIPTION OF THE INVENTION

Thus, it is the object of the present invention to provide a method and a device which provide a better way for inputting commands by means of pressure via a screen of a device.

The object is solved by a device, in particular multimedia device, like a smartphone, tablet, ultrabook, smartwatch, e-reader, laptop, navigation system, etc., as disclosed herein. Said device preferably comprises at least a screen, in particular a capacitive screen, a processor unit and at least one pressure sensor means or a plurality of pressure sensor means. The pressure sensor means is preferably mounted on a rigid element, wherein the rigid element is more rigid than the screen respectively the panel or the assembly group of components which is considered to be the screen, wherein the rigid element is arranged on one side of the sensor means and wherein the screen is arranged on an opposing side of the sensor means. Furthermore, a location detection unit is provided, wherein the location detection unit is configured to output a location signal, wherein the location signal provides location information for identifying the location where pressure is applied to the screen. The pressure sensor means is preferably configured to output a pressure signal, wherein the pressure signal preferably provides pressure information about the pressure measured by the pressure sensor means. The processor unit preferably determines a pressure value for the pressure applied to the screen by means of a location-pressure-function, wherein the location-pressure-function preferably defines at least a dependency between the location information and the pressure information, wherein the processor unit causes a function, an operation or an effect in dependency of the pressure value.

This solution is highly beneficial, since due to the location-pressure-function only one pressure sensor means, in particular one or exactly one pressure sensor, is necessary to detect pressure, in particular pressure values, applied to the screen in multiple locations respectively at multiple coordinates of the screen surface. Thus, the pressure applied to locations differing in the distance to the center of the screen or to a pressure sensor means can be computed due to the location-pressure-function.

At least one database is provided according to a further preferred embodiment of the present invention, wherein the database is connected with the processor unit and wherein the database provides correction values Z for multiple locations on the surface of the screen, wherein by means of the location-pressure-function a correction value Z is selected in dependency of the location information and wherein the location-pressure-function computes the pressure applied to the screen by manipulating the pressure information with the correction value or wherein the database provides a correction function for multiple locations on the surface of the screen, wherein by means of the location-pressure-function the correction function is applied in dependency of the location information and wherein the location-pressure-function computes the pressure applied to the screen by manipulating the pressure information with the correction function. The correction values are preferably generated by simulation or determined by experiments, thus the correction values are preferably adapted to the properties of the individual device series.

According to a further preferred embodiment of the present invention the location information is defined by a location value or a plurality of location values captured in a row, wherein each location value comprises a X-coordinate value and a Y-coordinate value, and the correction value Z depends on the bending properties of the screen, respectively the panel or the assembly group of components which is considered to be the screen, at the respective X- and Y-coordinate. The bending properties of screens differ due to screen size, layering, material, technology etc. thus it seems challenging to determine such information but since that kind of device is produced in high numbers the overall cost for such a determination is very low.

The location-pressure-function also incorporates one or multiple aging-correction values of an aging database or an aging-correction function according to a further preferred embodiment of the present invention, wherein the aging-correction-value represents a parameter for eliminating changes of at least one screen property, in particular stiffness, wherein the multiple-correction values represent a parameter for eliminating changes of at least one screen property, in particular stiffness, at different locations, wherein the aging-correction function represents a parameter for eliminating changes of at least one screen property, in particular stiffness or bending, in dependency of locations of the screen. This embodiment is beneficial since changes of the properties of the device can be compensated without any hardware modifications. Thus, the user experience remains the same independent of device property changes.

According to a further preferred embodiment of the present invention the aging correction function is based on the Arrhenius equation or a modified Arrhenius equation. This solution is highly beneficial, since the Arrhenius equation or a modified Arrhenius equation is a valid equitation that has been proven in multiple different fields of technology.

The pressure sensor means is arranged inside a battery according to a further preferred embodiment of the present invention. The battery preferably comprises a positive terminal and a negative terminal, wherein electric energy for operating the device is provided via a connection coupling the positive terminal with the negative terminal. This solution is also highly beneficial, since the sensor means can be built in the device together with the battery, thus the costs for mounting are small and the sensor means is arranged rigidly.

According to a further preferred embodiment of the present invention the battery comprises a cathode and an anode, wherein the cathode and anode are separated from each other by a first separator, the battery further comprises a pouch, wherein the pouch is separated from the anode by a second separator, wherein the pressure sensor means is arranged between the second separator and the pouch, wherein the rigid element is at least materialized respectively constituted by the second separator or by an assembly group at least comprising a separator and/or the cathode and/or the anode.

According to a further preferred embodiment of the present invention the rigid element is a part of the housing of the device, in particular a frame for mounting device components and/or for stabilizing the device.

The negative terminal and the positive terminal and the pressure sensor means are electrically coupled with a protection circuit according to a further preferred embodiment of the present invention, wherein the protection circuit is connected by means of a connection with the processor unit and/or with the screen and wherein power and data are conveyed by means of the connection from the protection circuit to the processor unit and/or to the screen. This embodiment is highly beneficial, since the power supply can be managed in dependency of pressure values applied to the screen. Preferably a danger-pressure value is predefined and stored in a data storage means, wherein the processor unit executes a safety routine, in particular reducing power output, in case the determined pressure value is above the danger-pressure value. Thus, even in cases in which the device will be destroyed the power supply can be stopped to reduce the risk of catching fire. Preferably, the danger-pressure value is at least two times higher than the average pressure value necessary for selecting any possible command and/or routine of a respective operation, wherein all respective operations executable by the processor unit are selectable by means of pressure values, wherein all pressure values for selecting the respective operations are in a predefined pressure value range. Thus, it is possible to use a pressure sensor inside the battery for safety reasons, however it is not a must. E.g. when overcharge, short circuit or leakage issue occur the pressure sensor means keeps the battery safe. The same pressure sensor means can be used for different functions. Pressure values that measured over screen (during normal operation) and pressure values when battery goes in danger are highly different. It is possible to put a hardware threshold, so the pressure sensor means can also be used for other purposes. The pressure sensor or pressure sensor means can be piezoelectric, magnetostrictive, capacitive, electro mechanic or MEMS based. The pressure sensor or pressure sensor means preferably can provide analog output where and ADC of MCU read and convert analog values or it can provide digital output such as I2C which directly transferred to MCU.

A command database is provided according to a further preferred embodiment of the present invention, wherein the command database provides commands and/or routines, wherein the processor unit selects at least one command and/or routine in dependency of the pressure value and/or a respective operation. This solution is beneficial since the number of potential commands increases in case of pressure sensitivity. At a specific location a wide range of pressure values can be applied to the screen, wherein pressure values below a threshold can cause a first command and pressure values above the threshold or above a further threshold can cause a further command. It is also conceivable that—in particular as an alternative or in addition—the time is measured one is pressing against the screen. Thus a specific pressure applied within a first time range respectively length can cause or select a first command and if the specific pressure is applied in another time range respectively length a second command can be caused or selected.

According to a further preferred embodiment of the present invention the device is a multimedia device, wherein the screen is a capacitive screen, wherein the capacitive screen defines a three dimensional (X-,Y-,Z-) matrix, wherein the location detection unit is a component of the capacitive screen and detects X- and Y-coordinates of the respective location, and wherein Z-coordinates are detected and processed for compensating of at least one effect of at least one optical component, in particular bending of one or more components of the screen, like LCD cell, optical films, LGP/LGF.

The above mentioned object of the invention is also solved by a method, as disclosed herein. The inventive method preferably at least comprises the steps: Providing a device having a screen, a processor unit and at least one pressure sensor means, wherein the pressure sensor means is mounted on a rigid element, wherein the rigid element is more rigid than the screen, wherein the rigid element is arranged on one side of the sensor means and wherein the screen is arranged on an opposing side of the sensor means, wherein location detection unit is provided. Outputting a location signal by the location detection unit, wherein the location signal provides location information for identifying the location where pressure is applied to the screen. Outputting a pressure signal by the pressure sensor means, wherein the pressure signal provides pressure information about the pressure measured by the pressure sensor means, wherein the processor unit determines a pressure value for the pressure applied to the screen by means of a location-pressure-function, wherein the location-pressure-function defines at least a dependency between the location information and the pressure information and wherein the processor unit causes a function, an operation or an effect in dependency of the pressure value.

According to a further preferred embodiment of the present invention at least one database is provided, wherein the database is connected with the processor unit and wherein the database provides correction values Z for multiple locations on the surface of the screen, wherein by means of the location-pressure-function a correction value Z is selected in dependency of the location information and wherein the location-pressure-function computes the pressure applied to the screen by manipulating the pressure information with the correction value, wherein the correction values Z are based on values measured or simulated with respect to the respective screen design of the device and with respect to respective X-/Y-coordinates.

The above mentioned object of the invention is also solved by a battery for providing power for a device at least having a screen, wherein at least one pressure sensor means for measuring a pressure applied to the screen is arranged inside the battery.

Thus, the present invention is directed to a device, a battery and a method with respect to pressure sensing for displays or screens, in particular with capacitive touch (PCAP or PCT), by preferably using a single preferably embedded sensor means or multiple preferably embedded sensor means inside a battery or attached to a frame and preferably located at the center and under the center of the screen. It is also possible, in particular in case of multiple sensor means, to arrange one or more sensor means spaced apart from the center.

The pressure sensor means located under the screen is preferably supported by a device battery or a back cover, and preferably measuring micron level displacements on the screen independent of touch location. Arranging the force respectively the pressure sensor means inside the batter is lowering cost and assembly cycles. Touch location is preferably detected by capacitive touch. According to location of touch, pressure information is preferably corrected by using an estimation matrix. Such an estimation matrix can be a 3D matrix X by Y by Z, where X×Y is the correction matrix across the screen surface; Z is the screen thickness and/or bending compensation factor. Screen or display can be any type of technology such as OLED or LCD. Such types of screens are not completely rigid and not homogenous. Especially LCD screens have many different layers, so that it is not possible to compensate errors with a 2D matrix. Dimension Z of correction matrix is used to compensate those non-homogeneities of LCD displays. And also another compensation values for Z is used to estimate value of aging. The solid battery is preferably a kind of any li-ion (lithium-ion) battery technology, wherein at least on pressure sensor means, in particular a slim pressure sensor means, is located at the top of the battery just before final packaging process and labeling. The slim pressure sensor is connected to control board of battery, according to claim above it can transfer pressure via analog or digital, with another feature ADC can be located on this board to convert analogue to digital. Wherein slim preferably describes a height or thickness of the pressure sensor means that is less than 10 mm, in particular less than 5 mm or less than 2 mm or less than 1 mm or less than 0,5 mm. With another alternative or additional feature the pressure sensor or pressure sensor means can be direct output pins on battery without using board on battery (where safety pressure function is disabled). Batteries with this special pressure sensor can be digitally identified with tag, so mobile phone can detect third party batteries.

Thus, this invention has unique features which cannot be found in the prior art. One very unique feature is that a single pressure sensor means placed underneath the screen can be sufficient. A further very unique feature is that compensating and correcting values are preferably read by using a 3D matrix, which particular preferably models display screen and/or models screen mechanics. A third very unique feature is that the sensor means is preferably embedded inside a battery. That simplifies handling and mounting and reduces the overall cost, because in some embodiment no additional mechanical fixation is used.

This invention is designed particularly for mobile phones, tablets and ultrabooks preferably where capacitive touch is used.

DETAILED DESCRIPTION OF THE INVENTION

Figure 1:
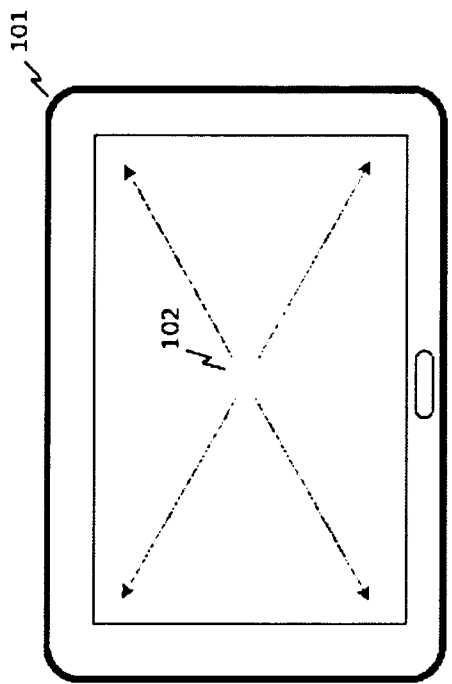
FIG. 1. Tablet application with pressure sensor
FIG. 2. Device with X×Y coordinates indicated
FIG. 3. Device with X×Y×Z coordinates and sensor indicated
FIG. 4. Cross sectional view of device
FIG. 5. 3D panel with coordinates
FIG. 6. LCD screen display
FIG. 7. 3D compensation matrix with X×Y×Z Coordinates
FIG. 8. Flow chart
FIG. 9. Pressure sensor means in an ideal case
FIG. 10. Application of pressure to the pressure sensor means of FIG. 9 in a real case at t=0 years
FIG. 11. Application of pressure to the pressure sensor means of FIG. 9 in a real case at t=5 years
FIG. 12. Pressure sensor means in a real case after compensation and correction
FIG. 13. a schematic visualization of the aging correction function
FIG. 14. a schematic illustration of an inventive battery assembly
Figure 2:
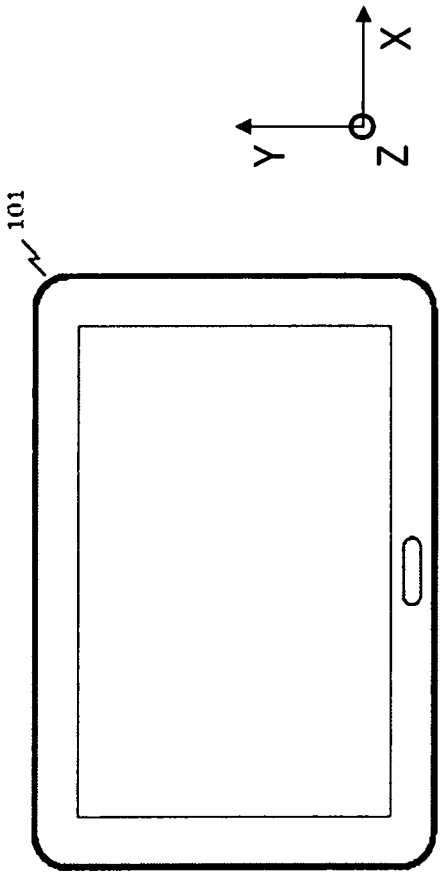

FIGS. 1 to 5 show an exemplary tablet application. The inventive solution can be implemented to mobile devices like phones or ultrabooks. Other than these particular applications any other application, in particular with capacitive touch, is possible. Capacitive touch 104 is highly beneficial since it also detects finger 103 positions. As shown in FIG. 1 pressure sensor 102 is embedded inside device 101. The location of the sensor means 102 is preferably in the centre of the screen 105 but it is also possible to place the pressure sensor means 102 spaced apart from the centre. It is also possible to use multiple pressure sensor means 102. Highly preferably are multiple sensor means, in particular multiple pressure sensor means 102 embedded into the battery 107 of the device 101 (cf. FIG. 4).

The disclosed invention preferably concerns a pressure sensing method in particular for capacitive touch screens 104, wherein a pressure sensor means 102 is preferably located inside a battery 107 or on a battery 107. The sensor means 102 is preferably a thin sensor, in particular when the device 101 is a mobile device. Such a pressure sensor means 102 can be one or more piezo electric sensor/s and/or one or more magnetostrictive sensor/s or any other technology. Analogue values are preferably read by a MCU or main IC or any other ADC and read values are preferably converted to digital. The sampled and quantized values have single dimension. As example signals are preferably read from 0V to 15V over 15V a threshold is preferably given. 0V-15V supplied from e.g. a piezo pressure sensor are preferably converted to 0-1000 integer values inside MCU. 0-1000 is a scalar, at the center of the matrix the values are near 1 (0.9-1 etc.) and they are decreasing by getting closer to the corners.

Figure 6:
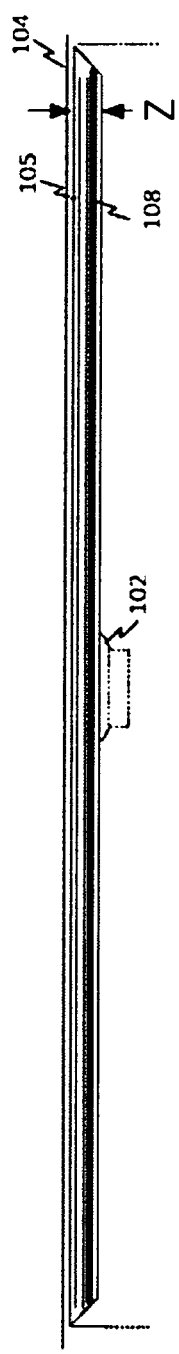
Figure 7:
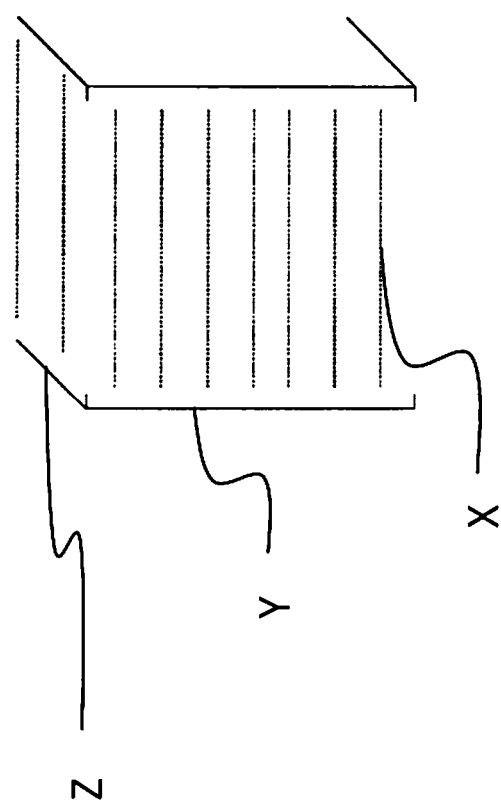

FIG. 6 shows a side view of a screen 105, wherein underneath the screen 105 a pressure sensor means 102 is arranged. The pressure sensor means 102 measures various pressure levels according to where it is pressed; preferably a 3D matrix is provided to measure exact values as shown in FIG. 7. The 3D matrix is used to compensate read values of the sensor means 102. Using only X×Y axis values is not enough for correct measurement, because display screen 105 is not homogenous mechanically in all directions. Z axis values are used to compensate effects of several optical components. The 2D surface part of X×Y×Z is X×Y. The X×Y matrix is created either heuristically (experimental) or simulation or combination of both during design stage. Possible methods (but not limited) are a vibrating sample screen and/or measuring displacement with laser vibrometer (or accelerometer) and obtaining correction multipliers. Z represents the vertical correction values, in particular representing properties of the LCD Cell, optical films 108 and/or LGP/LGF (if LCD screen is used) respectively and all have different bending stiffness. Again either heuristically (experimental) or simulation or combination is used to determine coefficients. Wherein each component can be analyzed individually and the properties of the screen 105 can be computed by adding all component properties. Alternatively the whole screen 105 is analyzed.

If just one pressure sensor means 102 is used the optimum place for the pressure sensor means 102 will be the center of the screen 105. If it is possible to use more than one sensor the optimal place can be changed. Of course it is possible to move the pressure sensor means 102 to another position if mechanical limitations occur. The 3D matrix can be adapted according to new position. The usage of multiple pressure sensor means 102 is also possible and increases accuracy.

In another embodiment the pressure sensor means 102 can be used alternatively or additionally as a safety sensor for the battery 107.

Figure 8:
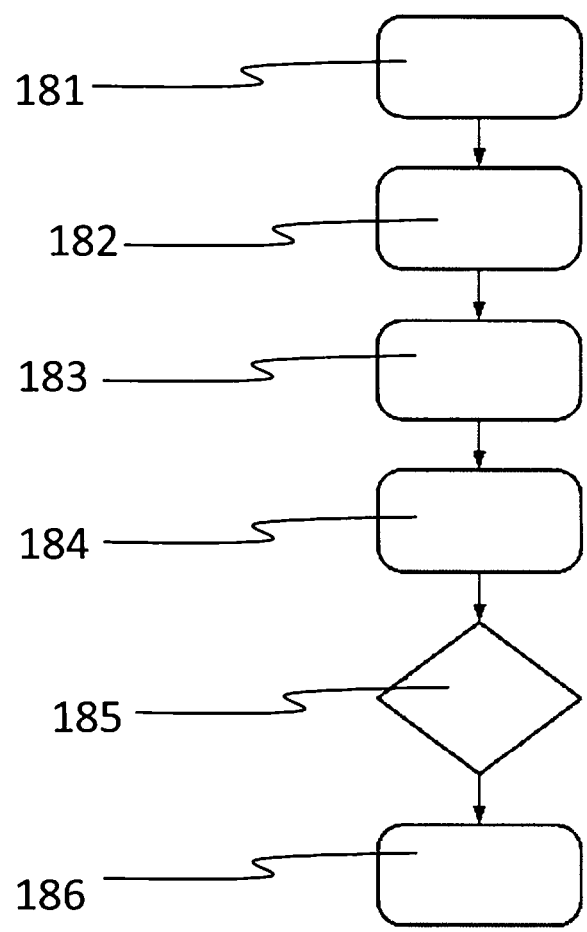

FIG. 8 shows a preferred process of the inventive method: The first step 182 represents the detection of touch, than the coordinates on the touch screen 105 are determined. As a next step 183 a pressure senor means signal is detected and the signal level is normalized, in particular by means of a 3D matrix, in a further step 184. Then, the force strength is determined in step 185 and in step 186 the touch force is reported.

FIG. 9 shows an ideal case for measuring pressure 120 with a pressure sensor means 102 arranged on a rigid element 106, in particular an infinite rigid plane with infinite mass.

FIG. 10 shows the pressure application of FIG. 9 in a real case. It can be understood from this illustration that the pressure 120 applied by a human finger 103 is in the majority of all cases applied in a distance to the center of the pressure sensor means 102. Thus a correction of the pressure value detected has to be carried out for the determination of the pressure applied at the location where the finger 103 touches the screen 105. This correction is done by the location-pressure-function.

Reference number 122 indicates a user hand or any other fixed plane like a table top, in particular for enhancing the rigidy of the element 106. Wherein the rigid element 106 is a finite plane with finite mass, wherein the stiffness of the plane is much higher (preferably multiple times higher) than the stiffness of LCD k plane, wherein the stiffness of LCD and/or wherein the k plane is preferably >>k LCD. Reference number 160a indicates the inner structure of the device 101 in an early stage respectively the properties of the device 101, in particular of the screen, at a time t=0.

FIG. 11 is similar to FIG. 10 but reference number 160b indicates the inner structure of the device 101 in an later stage respectively the properties of the device 101, in particular of the screen, at a time t=5 years. Thus a correction of the pressure value detected has to be carried out for the determination of the pressure applied at the location where the finger 103 touches the screen 105 and also for the aging of the properties of the device 101, in particular the stiffness of the screen 105. This correction is done by the location-pressure-function and an additional aging function or by a modified location-pressure-function that incorporates an aging function or aging values.

After the compensations and corrections discussed with respect to FIGS. 10 and 11 are carried out a situation as illustrated with FIG. 12 results. It is also conceivable toe compensate and/or correct effects resulting from the finite rigid element 106 by a rigidy compensation value.

Another novel feature of this invention is shown in FIG. 13 and shows that bendability varies in time due to aging. Another aging matrix or single variable, which is or represents the function of time is used to compensate aging effects. This coefficient is also determined either heuristically (experimental) or by simulation or by a combination thereof. As shown, the aging function is preferably a scalar multiplication with an aging matrix. The aging function can be a kind of Arrhenius eq., in particular exponential and/or depended on time.

All this matrixes depended on screen options and values are changed if screen and mechanic design of device changed with another feature and all this matrices can be stored in memory as look up table, according to screen options, which creates greater manufacturability.

Figure 14:
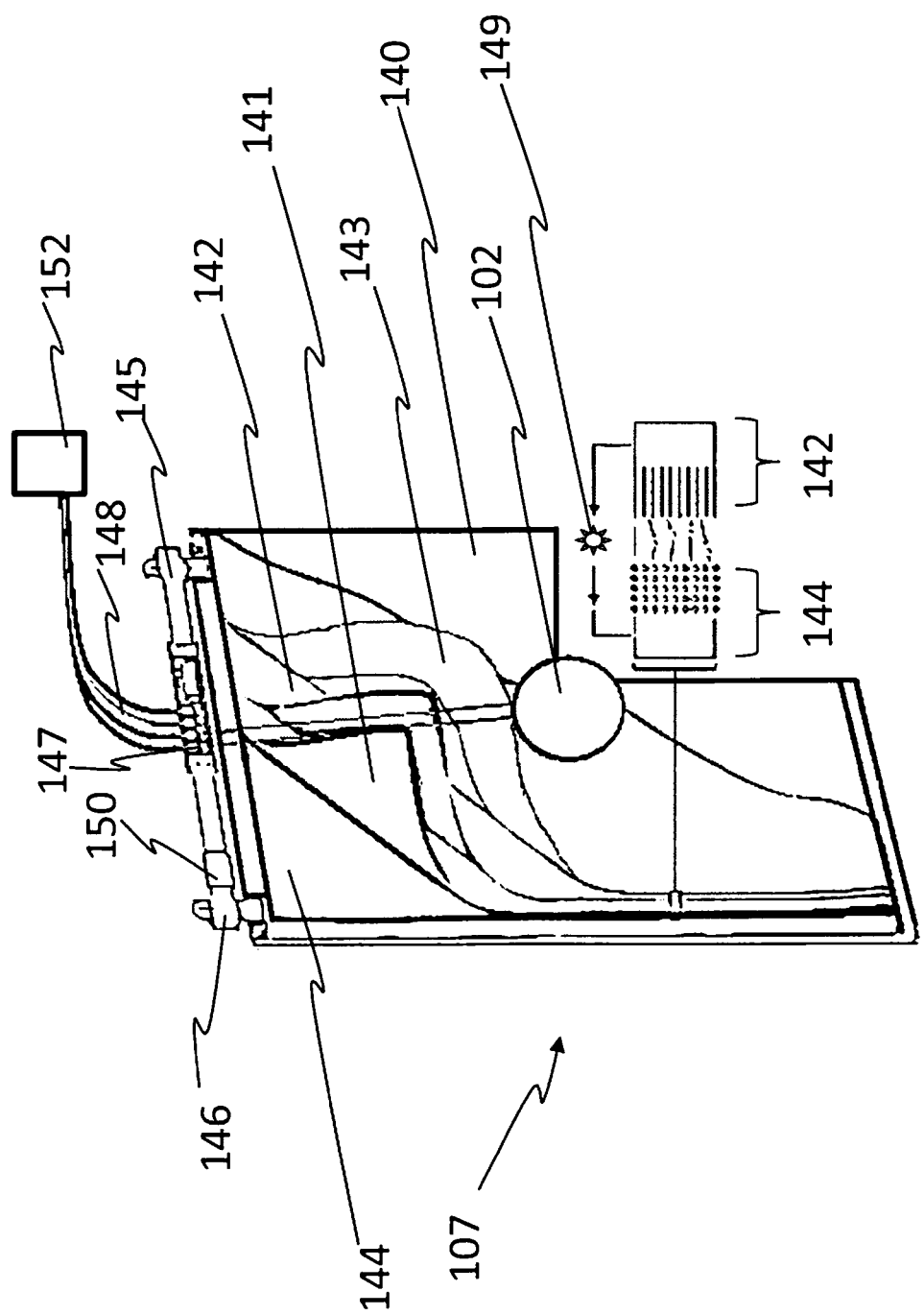

Thus, FIG. 13 shows from left to right a matrix, an aging correction matrix and an aging corrected matrix 134, wherein reference number 130 indicates an entrywise product and wherein reference number 132 indicates an aging function, in particular depending on time. FIG. 14 shows an assembly group comprising a battery 107, a protection circuit 147, wires 148 and a pressure sensor means 102.

It can be seen from this illustration that the battery 107 preferably comprises two terminals 145 and 146, wherein the first terminal 145 is a negative terminal and wherein the second terminal 146 is a positive terminal. Between the terminals 145, 146 is/are preferably a fuse 150 and/or the protective circuit 147 arranged. The protective circuit 147 is preferably via wires 148 connected or connectable with a processor unit 152 and/or a screen 105 of a device 101. The battery 107 preferably comprises a multilayer arrangement. One layer is preferably constituted by a cathode 144, in particular a cathode on aluminum. Above that cathode 144 is a first separator 141 arranged. Above the first separator 141 an anode 142, in particular on copper foil, is arranged. Preferably is above the anode 142 a second separator 143 arranged. The pressure sensor means 102 is preferably connected to or arranged on the second separator 143. The second separator 143 and the pressure sensor means are preferably covered by a pouch 140, in particular a foil pouch. Reference number 149 shows schematically the operation of the battery 107.

The pressure sensor means 102 can be a piezo sensor (or any other pressure sensor), in particular a sensor different from optical solutions, and therefore preferably needs to be fixed to a surface or plane (which is rigid and not bendable) and then it can measure the pressure applied to the other side correctly. Because LCD screens are not rigid enough and since pressure over LCD has to be measured, it is preferably necessary to fix the pressure sensor means 102 on a rigid and infinite plane.

So, a reference plane is required which is much more rigid and has more mass than the LCD screen 105 itself. When a user puts the device, in particular a phone, on his/her hand or leave it on table or another stiff surface, this surface becomes the reference surface. Of course battery or back cover can be bend, but they are stiff enough and stiffer then LCD.

The pressure sensor means 102 can be placed inside a battery, in particular a li-ion battery, which has anode-cathode and separator assembly highly rigid or also it can be placed on a frame, in particular a middle frame, if available (which can e.g. be made of or can comprise magnesium or aluminum alloy). The inventive method or device arrangement does not differ whether the pressure sensor means 102 is placed on a frame or inside the battery packaging. Using a battery has an advantage during manufacturing and cabling, wherein the middle frame preferably comprises or consists of magnesium and/or aluminum.

Thus, the invention describes a device 101, in particular multimedia device, and a method, wherein the device at least comprises a screen 105, a processor unit 152 and at least one pressure sensor means 102, wherein the pressure sensor means 102 is mounted on a rigid element 106, wherein the rigid element 106 is more rigid than the screen 105, wherein the rigid element 106 is arranged on one side of the sensor means 102 and wherein the screen 105 is arranged on an opposing side of the sensor means 102, wherein a location detection unit 190 is provided, wherein the location detection unit 190 is configured to output a location signal, wherein the location signal provides location information for identifying the location where pressure is applied to the screen 105, wherein the pressure sensor means 102 is configured to output a pressure signal, wherein the pressure signal provides pressure information about the pressure measured by the pressure sensor means 102, wherein the processor unit 152 determines a pressure value for the pressure applied to the screen 105 by means of a location-pressure-function, wherein the location-pressure-function defines at least a dependency between the location information and the pressure information and wherein the processor unit 152 causes a function, an operation or an effect in dependency of the pressure value.

LIST OF REFERENCE NUMBERS

101 Device, exemplary case tablet (can be mobile phone or ultrabook)
102 Pressure sensor means, in particular embedded inside battery
103 User finger which applies pressure
104 Capacitive touch on-cell (in-cell also possible)
105 Display screen
106 Rigid plane, in particularly inside battery
107 Battery
Various optical films and optical components
120 Pressure
122 Support, in particular a hand or a table top
130 Entrywise Product
132 Aging Function, in particular depending on time
140 Foil pouch
141 First Separator
142 Anode on copper foil
143 Second Separator
144 Cathode on Aluminum
145 Negative Terminal
146 Positive Terminal
147 Protection Circuit
148 Wiring
149 Operation
150 Fuse
152 Processor Unit
160a Inner Structure in an early stage
160b Inner Structure in a later stage
181 Detect Touch
182 Get Coordinates on Touchscreen
183 Measure Pressure Sensor Signal, in particular Piezo-electric Electrode's Signal
184 Normalize Signal Level, in particular by 3D matrix
185 Determine Force Strength
186 Report Touch Force
190 Location Detection Unit

The invention claimed is:

1. Device (101), in particular multimedia device, at least comprising a screen (105),
a processor unit (152) and
at least one pressure sensor means (102),
wherein the pressure sensor means (102) is mounted on a rigid element (106),
wherein the rigid element (106) is more rigid than the screen (105),
wherein the rigid element (106) is arranged on one side of the pressure sensor means (102) and
wherein the screen (105) is arranged on an opposing side of the pressure sensor means (102),
wherein the screen (105) is directly arranged on the pressure sensor means (102),
wherein a location detection unit (190) is provided,
wherein the location detection unit (190) is configured to output a location signal,
wherein the location signal provides location information for identifying the location where pressure is applied to the screen (105),
wherein the pressure sensor means (102) is configured to output a pressure signal,
wherein the pressure signal provides pressure information about a pressure measured by the pressure sensor means (102),
wherein the processor unit (152) determines a pressure value for the pressure applied to the screen (105) by means of a location-pressure-function,
wherein the location-pressure-function defines at least a dependency between the location information and the pressure information and
wherein the processor unit (152) causes a function, an operation or an effect in dependency of the pressure value
wherein the location information is defined by a location value or a plurality of location values captured in a row, wherein each location value comprises a X-coordinate value and a Y-coordinate value, and
a correction value Z depends on the bending properties of the screen (105) at the respective X- and Y-coordinate value
at least one database is provided,
wherein the database is connected with the processor unit (152) and
wherein the database provides correction value Z for multiple locations on the surface of the screen (105),
wherein by means of the location-pressure-function a correction value Z is selected from the database in dependency of the location information and wherein the location-pressure-function computes the pressure applied to the screen by manipulating the pressure information with the correction value Z;

wherein the location pressure-function also incorporates one or multiple aging-correction values of an aging database or an aging-correction function, wherein the aging-correction-value represents a parameter for eliminating changes of at least one screen property, in particular stiffness, wherein the multiple-correction values represent a parameter for eliminating changes of at least one screen property, in particular stiffness, at different locations, wherein the aging-correction function represents a parameter for eliminating changes of at least one screen property, in particular stiffness, in dependency of locations of the screen (105), wherein the aging correction function is preferably based on the Arrhenius equation or a modified Arrhenius equation.

2. Device according to claim 1, characterized in that the pressure sensor means (102) is arranged inside a battery, wherein the battery comprises a positive terminal (146) and a negative terminal (145), wherein electric energy for operating the device (101) is provided via a connection coupling the positive terminal (146) with the negative terminal (145).

3. Device according to claim 2, characterized in that the battery (107) comprises a cathode (144) and an anode (142), wherein the cathode (144) and anode (144) are separated from each other by a first separator (141), the battery (107) further comprises a pouch (140), wherein the pouch (140) is separated from the anode (142) by a second separator (143), wherein the pressure sensor means (102) is arranged between the second separator (143) and the pouch (140), wherein the rigid element (106) is at least materialized by the second separator (143).

4. Device according to 2, characterized in that the negative terminal (145) and the positive terminal (146) and the pressure sensor means (102) are electrically coupled with a protection circuit (147), wherein the protection circuit (147) is connected by means of a connection with at least one of the processor unit (152) and the screen (105) and wherein power and data are conveyed by means of the connection from the protection circuit (147) to at least one of the processor unit (152) and the screen (105).

5. Device according to claim 1, characterized in that, the rigid element (106) is a part of the housing of the device (101), in particular a frame for at least one of mounting device components and stabilizing.

6. Device according to claim 1, characterized in that a command database is provided, wherein the command database provides at least one of commands and routines, wherein the processor unit (152) selects at least one of commands and routines in dependency of at least one of the pressure value and a respective operation.

7. Device according to claim 1, characterized in that a danger-pressure value is predefined and stored in a data storage means, wherein the processor unit (152) executes a safety routine, in particular reducing power output, in case the determined pressure value is above the danger-pressure value.

8. Device according to claim 7, characterized in that, the danger-pressure value is at least two times higher than the average pressure value necessary for selecting any possible command and/or routine of a respective operation, wherein all respective operations executable by the processor unit (152) are selectable by means of pressure values, wherein all pressure values for selecting the respective operations are in a predefined pressure value range.

9. Device according to claim 1, characterized in that the device (101) is a multimedia device, wherein the screen (105) is a capacitive screen (105), wherein the capacitive screen (105) defines a three dimensional (X-,Y-,Z-) matrix, wherein the location detection unit (190) is a component of the capacitive screen (105) and detects X- and Y-coordinates of the respective location, and wherein Z-coordinates are detected and processed for compensating of at least one effect of at least one optical component, in particular bending of one or more components of the screen.

10. Device (101), in particular multimedia device, at least comprising a screen (105), a processor unit (152) and at least one pressure sensor means (102), wherein the pressure sensor means (102) is mounted on a rigid element (106), wherein the rigid element (106) is more rigid than the screen (105), wherein the rigid element (106) is arranged on one side of the pressure sensor means (102) and wherein the screen (105) is arranged on an opposing side of the pressure sensor means (102), wherein the screen (105) is directly arranged on the pressure sensor means (102), wherein a location detection unit (190) is provided, wherein the location detection unit (190) is configured to output a location signal, wherein the location signal provides location information for identifying the location where pressure is applied to the screen (105), wherein the pressure sensor means (102) is configured to output a pressure signal, wherein the pressure signal provides pressure information about a pressure measured by the pressure sensor means (102).

wherein the processor unit (152) causes a function, an operation or an effect in dependency of the pressure value wherein the location information is defined by a location value or a plurality of location values captured in a row, wherein each location value comprises a X-coordinate value and a Y-coordinate value, and a correction value Z depends on the bending properties of the screen (105) at the respective X -and Y-coordinate value at least one database is provided, wherein the database is connected with the processor unit (152) and wherein the database provides correctio value Z for multiple locations on the surface of the screen (105), wherein by means of the location-pressure-function a correction value Z is selected from the database in dependency of the location information and wherein the location-pressure-function computes the pressure applied to the screen by manipulating the pressure information with the correction value Z, wherein the pressure sensor (102) is arranged inside a battery, wherein the battery comprises a positive terminal (146) and a negative terminal (145), wherein electric energy for operating the device (101) is provided via a connection coupling the positive terminal (146) with the negative terminal (145).

11. Device (101), in particular multimedia device, at least comprising a screen (105), a processor unit (152) and at least one pressure sensor means (102), wherein the pressure sensor means (102) is mounted on a rigid element (106), wherein the rigid element (106) is more rigid than the screen (105), wherein the rigid element (106) is arranged on one side of the pressure sensor means (102) and wherein the screen (105) is arranged on an opposing side of the pressure sensor means (102), wherein the screen (105) is directly arranged on the pressure sensor means (102), wherein a location detection unit (190) is provided, wherein the location detection unit (190) is configured to output a location signal, wherein the location signal provides location information for identifying the location where pressure is applied to the screen (105), wherein the pressure sensor means (102) is configured to output a pressure signal, wherein the pressure signal provides pressure information about a pressure measured by the pressure sensor means (102), wherein the processor unit (152) determines a pressure value for the pressure applied to the screen (105) by means of a location-pressure-function, wherein the location-pressure-function defines at least a dependency between the location information and the pressure information and wherein the processor unit (152) causes a function, an operation or an effect in dependency of the pressure value wherein the location information is defined by a location value or a plurality of location values captured in a row, wherein each location value comprises a X-coordinate value and a Y-coordinate value, and a correction value Z depends on the bending properties of the screen (105) at the respective X- and Y-coordinate value at least one database is provided, wherein the database is connected with the processor unit (152) and wherein the database provides correction value Z for multiple locations on the surface of the screen (105), wherein by means of the location-pressure-function a correction value Z is selected from the database in dependency of the location information and wherein the location-pressure-function computes the pressure applied to the screen by manipulating the pressure information with the correction value Z, wherein a danger-pressure value is predefined and stored in a data storage means, wherein the processor unit (152) executes a safety routine, in particular reducing power output, in case the determined pressure value is above the danger-pressure value.

\* \* \* \* \*